United States Patent [19]

Murakawa et al.

[11] Patent Number: 4,697,453

[45] Date of Patent: Oct. 6, 1987

[54] APPARATUS FOR MONITORING BURDEN DISTRIBUTION IN FURNACE

[75] Inventors: Shigemi Murakawa; Seiji Taguchi; Makoto Nomura; Ryoji Takabe; Yoshiharu Iwashita; Masahiro Ishii, all of Chiba, Japan

[73] Assignee: Kawasaki Steel Corp., Hyogo, Japan

[21] Appl. No.: 751,088

[22] Filed: Jul. 2, 1985

[30] Foreign Application Priority Data

Jul. 5, 1984 [JP] Japan .............................. 59-137868
Jul. 6, 1984 [JP] Japan .............................. 59-140340

[51] Int. Cl.$^4$ .......................... G01F 23/00; C21B 7/24
[52] U.S. Cl. .............................. 73/290 R; 73/304 R; 266/99
[58] Field of Search ............... 110/101 CF, 101 CC, 110/101 CD; 122/4 D; 73/304 R, 290 R, 293, DIG. 9; 324/65 P; 340/618, 619, 620; 374/208, 136, 137, 112, 139, 140; 266/90, 92, 99

[56] References Cited

U.S. PATENT DOCUMENTS

| | | | |
|---|---|---|---|
| 2,815,663 | 12/1957 | Lupfer | 374/208 |
| 3,597,975 | 8/1971 | Kern | 374/140 |
| 3,896,674 | 7/1975 | Kolb | 374/140 |
| 4,003,261 | 1/1977 | Nautet et al. | 73/DIG. 9 |
| 4,037,761 | 7/1977 | Kemlo et al. | 73/304 R |
| 4,169,377 | 10/1979 | Scheib | 73/304 R |
| 4,203,325 | 5/1980 | Cowles et al. | 73/304 R |
| 4,247,784 | 1/1981 | Henry | 73/293 |
| 4,411,533 | 10/1983 | Loftus et al. | 374/139 |
| 4,413,810 | 11/1983 | Tenberg et al. | 73/304 R |
| 4,513,671 | 4/1985 | Eshleman | 110/101 CD |

FOREIGN PATENT DOCUMENTS

| | | | |
|---|---|---|---|
| 2258306 | 7/1973 | Fed. Rep. of Germany | 266/99 |
| 2605365 | 9/1976 | Fed. Rep. of Germany | 374/140 |
| 81903 | 7/1975 | Japan | 374/137 |
| 50336 | 3/1984 | Japan | 266/99 |
| 50338 | 3/1984 | Japan | 266/99 |
| 104407 | 6/1984 | Japan | 266/92 |
| 205408 | 11/1984 | Japan | 266/99 |
| 1019712 | 1/1986 | Japan | 266/99 |
| 1019713 | 1/1986 | Japan | 266/99 |
| 1099609 | 5/1986 | Japan | 266/92 |
| 7910 | of 1908 | United Kingdom | 374/140 |
| 1133295 | 1/1985 | U.S.S.R. | 266/99 |

Primary Examiner—Charles Frankfort
Assistant Examiner—W. Morris Worth
Attorney, Agent, or Firm—Austin R. Miller

[57] ABSTRACT

A burden distribution monitoring apparatus, according to the present invention, includes a hollow cylindrical sonde having an inner end radially movable within the internal space of a furnace, such as a shaft furnace. The sonde carries a burden layer depth sensor and/or a burden grain distribution sensor for radially shifting working ends of the sensors. With the foregoing construction, burden depth and/or grading of the burden can be monitored in a plurality of radial points in the furnace.

30 Claims, 22 Drawing Figures

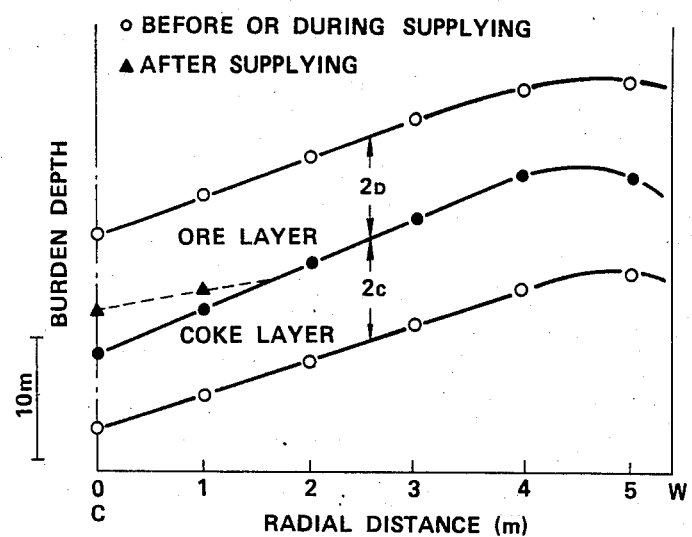
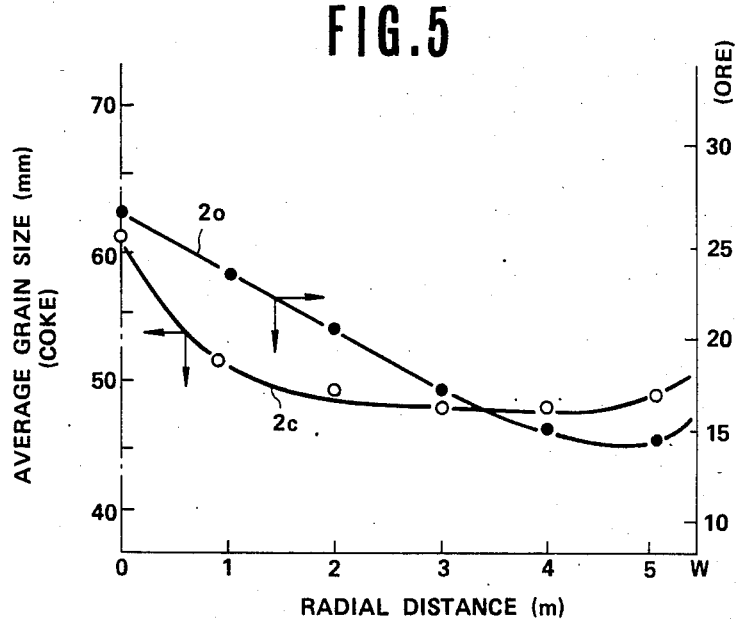

APPARATUS FOR MONITORING BURDEN DISTRIBUTION IN FURNACE

BACKGROUND OF THE INVENTION

The present invention relates generally to an apparatus for monitoring burden distribution in a furnace, such as a shaft or blast furnace or the like. More particularly, the invention relates to an apparatus for monitoring the depth of an upper burden layer or layers and monitoring grain distribution in the burden layer.

As is well known, the shape of individual grains of the burden, and the depth and grain distribution of the upper burden layer or layers are very important factors in determining gas flow distribution and melting region configuration, which significantly influence the performance of the furnace. For instance, given identical conditions and material, furnace performance tends to be determined by burden distribution, i.e. the shape of individual grains of the burden and the depth and grain distribution in the upper burden layer or layers. Therefore, in order to keep the furnace performance at a desired level, it is necessary to maintain a proper burden distribution.

Maintaining a proper burden distribution requires that the burden distribution in the furnace be monitored. Conventionally, a sensor transversely movable across a burden layer measures the burden depth and inclination of the interface between the different burden layers or a vertically movable sensor measures the depth of the burden layer or layers. However, such conventional sensors measure only the depth of the burden layer or layers and cannot monitor grain distribution in the layer, which significantly influence gas flow distribution.

However, in the prior art, optical sensors have been used to monitor not only the depth of the burden layer but also the grain distribution of the burden. This kind of sensor comprises a light emitter which emits a laser beam or visual light beam toward the upper surface of the burden and an optical monitor directed toward the upper surface of the burden. The burden depth is measured by the difference in vertical height of the burden upper surface before and after supplying the burden.

Another conventional burden distribution measurement technique employs an arrangement of a stationary frame in the furnace, a plurality of first sensors monitoring burden depth and a plurality of second sensors monitoring grain distribution, the sensors fixedly mounted on the stationary frame.

These later systems have the advantage of monitoring not only the burden layer depth but also the grain distribution of the burden layer. However, in the case of optical sensors, measurement of the burden layer depth tends to be inaccurate due to irregularity of the upper surface of the burden layer when it is layed down. On the other hand, in the latter case, since the sensors are subject to relatively high furnace temperatures, the sensors have a relatively short service life and require frequent maintenance.

SUMMARY OF THE INVENTION

In view of the aforementioned drawbacks in conventional systems, it is a principle object of the present invention to provide a durable apparatus which can accurately measure the depth and grain distribution of the upper burden layer or layers.

Another object of the invention is to provide an apparatus for monitoring the depth and grain distribution of a burden layer, which has sensors for monitoring the depth of the burden layer and for monitoring grain distribution, which sensors can be individually installed and removed from the furnace.

In order to accomplish the aforementioned and other objects, a burden distribution monitoring apparatus, according to the present invention, includes a hollow cylindrical sonde having an inner end radially movable within the internal space of a furnace, such as a shaft furnace. The sonde carries a burden layer depth sensor and/or a burden grain distribution sensor for radially shifting working ends of the sensors.

With the foregoing construction, burden depth and/or grading of the burden can be monitored in a plurality of radial points in the furnace.

According to one aspect of the invention, an apparatus for monitoring burden distribution in a furnace comprises a hollow cylindrical sonde having one end to be inserted into an internal space of the furnace, the sonde being movable relative to the furnace for shifting the position of the one end in radial direction, a burden distribution monitoring sensor for monitoring burden distribution in the upper region of the furnace and producing a signal indicative of monitored burden distribution, the sensor extending through the sonde and movable along the latter, and having a working end for monitoring burden distribution, which working end extends from the one end of the sonde and adapted to be radially displaced according to displacement of the one end of the sonde, and a data processor associated with the sensor for receiving the burden distribution indicative signal for deriving burden distribution indicative data based thereon.

The sensor comprises a burden layer depth sensor for monitoring depth of burden layer. Alternatively, the sensor comprises a burden grain distribution sensor for monitoring grading of the burden.

In the preferred embodiment, the sensor comprises a burden depth sensor and a burden grain distribution sensor commonly guided by the sonde. The burden depth sensor and a burden grain distribution sensor can extend through the sonde in parallel relationship to each other.

The burden depth sensor comprises a flexible sensor body including a plurality of electrodes for monitoring electrical resistance therebetween for detecting the border of the burden layer. The burden depth sensor body is protected by a flexible protective cover extending with the sensor body. The protective cover comprises a plurality of linked blocks which is adapted to be bent in a predetermined direction and to be prevented from bending in a direction other than the predetermined direction. The sensor body comprises a plurality of blocks which are linked to adjacent blocks, and electrodes formed on the blocks located at predetermined longitudinal positions and electrically insulated from the blocks.

The linked blocks are adapted to be bent in a predetermined direction and prevented from bending in directions other than the predetermined direction.

On the other hand, the burden grain distribution sensor comprises an optical sensor adapted to monitor the grading on the upper surface of the burden in the furnace. The sensor further comprises means for cooling the sensor. The sensor is covered with a flexible pipe which defines therein a cooling fluid path.

The cooling fluid flowing through the cooling fluid path is $N_2$ gas which also serves as purging fluid for the working end of the sensor. The cooling means further comprises a liquid coolant chamber defined adjacent the working end of the sensor for cooling the working end. The liquid coolant chamber is in communication with a liquid coolant source by means of a flexible tube which is wound around the sensor approximately over the length of the flexible pipe.

BRIEF DESCRIPTION OF THE DRAWINGS

The present invention will be described with reference to the drawings, throughout which matching labels denote identical or closely corresponding elements and in which:

FIG. 4 is a plot of radial burden interface profiles showing the effect of addition of the uppermost burden layer;

FIG. 5 is a graph of average grain size versus radial position within the furnace for both coke and ore burden layers;

DESCRIPTIOBN OF THE PREFERRED EMBODIMENT

Figure 1:
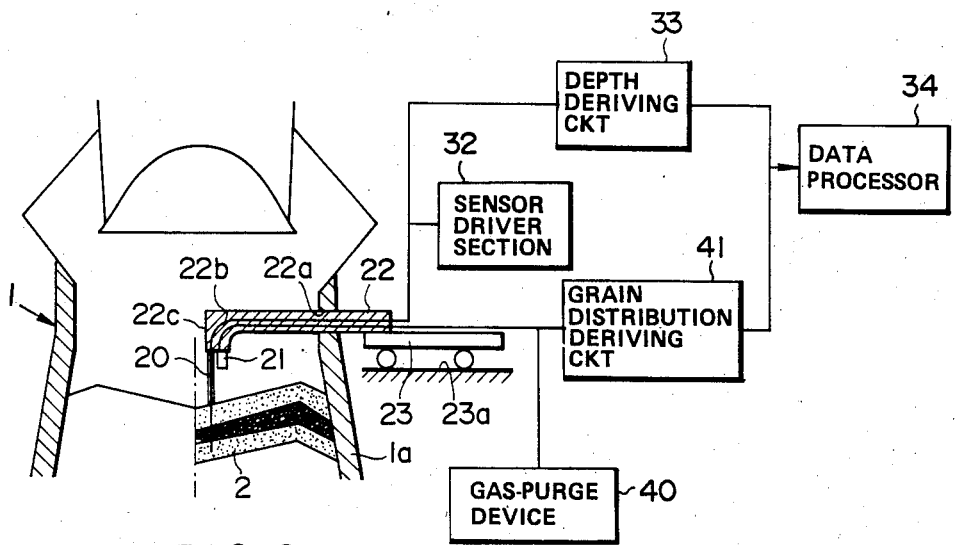
FIG. 1 is a diagram of a shaft furnace and an apparatus for monitoring burden distribution according to a first embodiment of the present invention.

Referring now to the drawings, particularly to FIG. 1, the first embodiment of a burden distribution monitoring apparatus according to the present invention, generally comprises a cylindrical sonde 22 supported by and extending from a movable carriage 23. The carriage 23 can be driven toward and away from a furnace, such as a shaft furnace, along a platform 23a level with the top of the furnace. The sonde 22 lies horizontally with its free end 22b extending into the interior of the furnace 1 through an opening 22a in the furnace wall 1a. A guide 22c extends downwards from the free end 22b of the sonde, so that the sonde 22 and the guide 22c define an essentially L-shaped conduit which serves as a "guide path 22d" for sensors 20 and 21. The sensors 20 and 21 measure the depth of a burden layer or burden layers and monitor grain distribution of the burden layer or layers, respectively. The sensor 20 designed to measure the burden layer depth will be referred to hereafter as "burden depth sensor". The sensor designed to monitor the grain distribution of the burden layer, will be referred to hereafter as "grain sensor".

Figure 2:
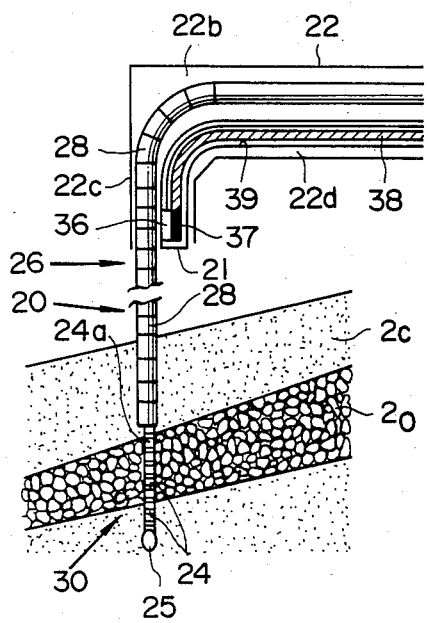
FIG. 2 is an enlarged view of critical elements of the sensor assembly shown in FIG. 1.
Figure 3:
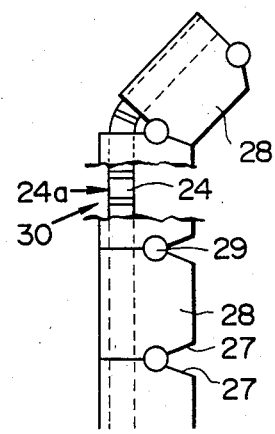
FIG. 3 is an enlarged view of the sensor assembly of FIG. 2 showing the flexible cover in greater detail.

As shown in FIG. 2, the burden depth sensor 20 is in the form of a flexible snake and comprises a flexible tube 24a and a plurality of electrically conductive electrodes 24 spaced at regular intervals along the flexible tube. The assembly of the flexible tube 24a and the electrodes 24 is referred to hereafter as "depth sensor assembly 30". The depth sensor assembly 30 is covered along at least part of its length with a flexible cover 26 in the form of a chain of pivotably joined blocks 28. As shown in FIG. 3, each block 28 has a tapered cut-out 27 which allows pivotal movement of adjoining blocks to a given radius of curvature about a connector pin 29. The cut-outs 27 all lie on one side of the connector pin 29 so that the flexible cover 26 can curve in only one direction. The depth sensor assembly 30 passes through openings in the blocks 28. Thus, the cover 26 protects the depth sensor assembly 30 from impact when burden is being inserted into the furnace 1. Also, the cover 26 prevents the depth sensor assemby 30 from being displaced toward the center of furnace as burden is added to the furnace.

A stainless steel weight 25 is fixed to the end of the flexible tube 24a. The weight 25 aids downward migration of the depth sensor assembly 30. The depth sensor assembly 30 is wound onto a reel (not shown) in a sensor driver section 32 which uses an electric motor to drive the reel back and forth, and so vertically position the depth sensor assembly 30.

As particularly shown in FIG. 2, the depth sensor assembly 30 is lowered into the burden, which comprises alternating layers of coke and metal-bearing ore. The vertical range of the depth sensor assembly 30 is chosen to cover at least the uppermost layer of coke or ore. In the example of FIG. 2, uppermost layer $2_c$ is a coke layer and the next layer $2_o$ is a layer of ore. Empirical measurements show that electrical resistance between adjacent electrodes positioned in the coke layer is relatively high and between the adjacent electrodes in the ore layer, the resistance is relatively low. Therefore, by counting number of electrodes between which the resistances are essentially the same, the depth of a coke layer and an adjoining ore layer can be measured.

The depth sensor assembly 30 outputs a signal indicative of the overall resistance value to a depth deriving circuit 33. The depth deriving circuit 33 outputs a depth indicative signal having a value derived from the signal of the depth sensor assembly 30. The depth indicative signal is sent to a data processor 34 which records the depth data for use in burden supply control.

After monitoring the burden layer depths, the depth sensor assembly 30 is rolled back onto the reel and thus removed from the burden. Thereafter, the sonde 22 shifted horizontally to move the depth sensor assembly 30 to another monitoring part. By repeating this procedure, the depth of the burden layer or layers can be measured at several different monitoring points.

In the shown embodiment, the sonde 22 also carries the optical grain sensor 21. The grain sensor 21 generally comprises a light emitter 36 and an optical image monitor 37 which is connected via flexible optical fiber 38 to a grain distribution deriving circuit 41 including an image analyzer. A purging gas passage 39 is defined around the grain sensor. The passage 39 is connected to a gas-purge device 40 to recirculate an inert purging gas through the purging gas path. Such grain sensors for monitoring grain distribution across a burden surface are well known and thus need not be discussed further.

The grain distribution deriving circuit 41 derives the average grain size at each monitoring point and produces an average grain size indicative signal. This average grain size indicative signal is sent to and recorded by the data processor 34 for latter use in burden supply control.

As set forth above, since the sonde 22 moves horizontally, the grain size distribution can be monitored at a plurality of different radial positions across the furnace.

The optical fiber 38 with the light emitter 36, the image monitor 37 and the purging gas path 39 are movable within the sonde 22 independently of the aforementioned burden depth sensor assembly 30. On the other hand, the grain sensor 21 is designed to be secured or held firmly to the guide 22c so as not to vibrate during the grain size distribution monitoring operation. Any known suitable securing means may be used to secure the grain sensor 21 to the guide 22c. The means for securing the grain sensor 21, however, must allow movement of the grain sensor along the sonde 22 and the guide 22c.

It should be appreciated that, although the shown first embodiment utilizes a sonde 22 housing both the depth sensor assembly 30 and the grain sensor 21, it would be possible to use a sonde receiving only one of the depth sensor assembly and the grain sensor. In this case, the sensor path defined in the sonde would be used for only one of the sensors, and in that case, two sondes would be mounted on carriages 23 for independent movement.

FIGS. 4 and 5 show the results of measurements of the burden layer depth and grain size distribution taken on a shaft furnace of 4000 m$^3$ capacity. The burden depths of the uppermost ore layer $2_o$ and the next, uppermost coke layer $2_c$ were measured. The monitoring points lie along a radius extending from the center C of the furnace to the inner periphery W of the furnace wall 1a. In FIG. 4, each curve represents the interface between adjacent layers. As fresh burden $2_o$ is added, the coke layer $2_c$ can be observed to rise near the center of the furnace. This occurs as coke slumps towards the furnace center to form a mixed layer of the ore and coke.

FIG. 5 shows the results of surveillance of the grain size distribution of the upper surface of the burden. The line $2_c$ shows distribution of coke grains and the line $2_o$ shows the distribution of ore grains.

Figure 6:
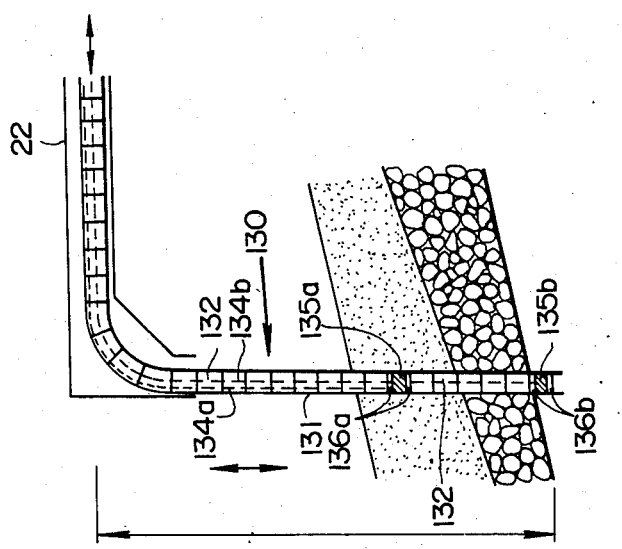
FIG. 6 is a view similar to FIG. 2 of a second preferred embodiment of the present invention.
Figure 7:
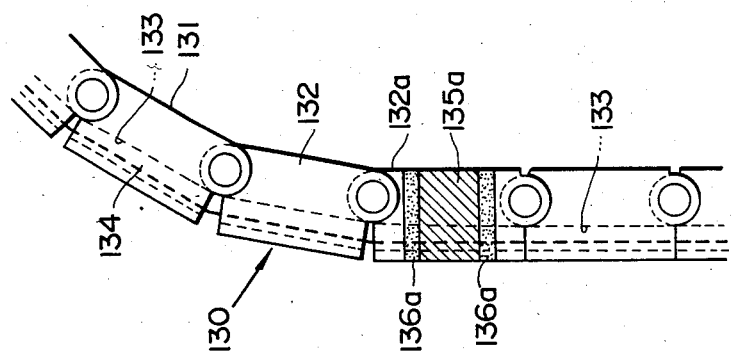
FIG. 7 is a view similar to FIG. 3 of the second embodiment of the sensor assembly in FIG. 6.

FIGS. 6 and 7 show a modification to the burden depth sensor of the foregoing first embodiment of the burden distribution monitoring apparatus according to the present invention. In this modification, the depth sensor assembly 130 comprises a flexible chain 131 made of an electrically shielded and heat-resistant material. Each block 132 of the chain 131 has a through opening 133. The openings 133 through the blocks 132 are all aligned, allowing a conductive cables 134a and 134b to pass therethrough. One block 132a in the chain 131 has a positive electrode 135a which is connected to the conductive cable 134a and electrically insulated from the blocks 132 by means of an insulator 136a. Another block 132b has a negative electrode 135b connected to the conductive cable 134b and electrically insulated from the block 132 by means of the insulator 136b. A given number of non-conductive blocks 132 separate the blocks 132a and 132b and serves as negative electrodes.

Figure 8:
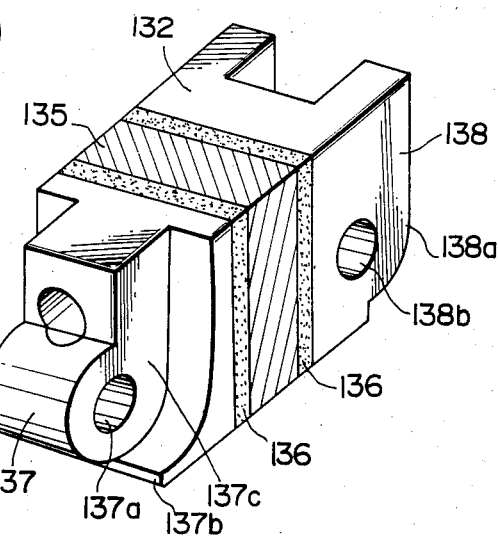
FIG. 8 is a perspective view of a single block of the chain of the second embodiment of the sensor assembly of FIG. 7.
Figure 9:
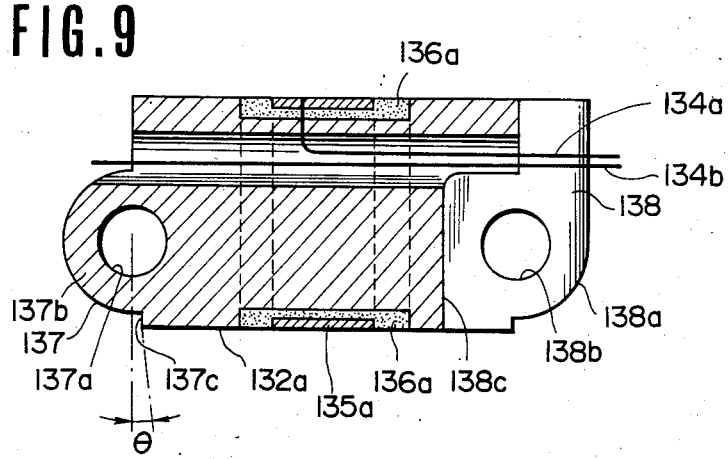
FIG. 9 is a sectional view through a block as in FIG. 8.

Each block 132 is pivotably connected to adjacent blocks by means of connecting pins 137. As best shown in FIGS. 8 and 9, a rounded extension 137b extends from one longitudinal face. The extension 137 has a transversely extending opening 137a. An extension 138 with round lower corner 138a and a transverse opening 138b is provided on the opposite longitudinal face. The extensions 137 and 138 are therefore positioned for interengagement with the extensions of adjoining blocks 132 by means of pins passing through the aligned openings 137a, 138b.

The edge 137c of the longitudinal face extending downwards from the extension 137 is offset at an angle $\theta$ from the vertical. This angle $\theta$ allows each block 132 to pivot relative to adjacent blocks. Therefore, the chain 131 can conform to the sensor path defined in the sonde. On the other hand, the edge 138c of the extension 138 abuts the edge 137c of the extension 137 to interfer with pivotal movement of the block relative to the adjacent blocks in the direction opposite to the direction needed to follow the sensor path in the sonde. This satisfactorily prevents the burden depth sensor from being displaced toward the furnace center as fresh burden is added.

The modified burden depth sensor is used as described below.

Figure 10:
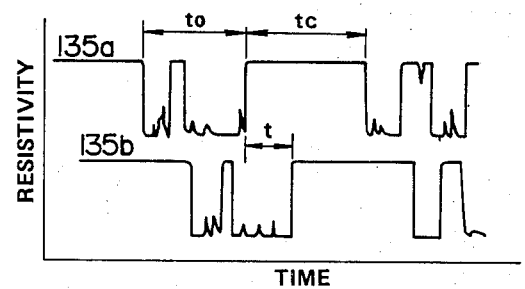
FIG. 10 shows a typical output waveform of the burden depth sensor of FIG. 6.

The depth sensor is initially inserted into the burden through the burden layers and is lowered at a speed v. Accordingly, the burden layers moved downwardly relative to the positive electrodes 135a and 135b which are arranged at vertically spaced relationship at a predetermined distance h and, thus the coke and ore layers as alternatively supplied passes across the electrodes 135a and 135b at a different timing, the time difference of which is representative of the lowering speed v of the burden. As the positive electrodes 135a and 135b are vertically distanced at the predetermined distance and the resistivity of the coke layer and ore layer is substantially different, the signals from the electrodes 135a and 135b vary as shown in FIG. 10 with the resistivity of the burden layer. In the period $t_c$, the electrodes 135a and 135b move through the ore layer $2_o$ which has a relatively low resistivity. On the other hand, in the period $t_0$, the electrodes 135a and 135b passes through the coke layer $2_c$ which has a substantially high resistivity. The depth of each of the coke and ore layers $2_c$ and $2_o$ can then be derived on the basis of the time difference t of the variation timing of the resistivity of the layers and the periods $t_c$ and $t_o$ from the following equations:

$$D_c = t_c \times v$$

$$D_o = t_o \times v$$

This technique for measurement of the depth of burden layers was already disclosed in the Published Japanese Patent Application (Tokkai) Showa No. 50-81903. The contents of this Japanese publication are hereby incorporated by reference for the sake of disclosure.

Figure 11:
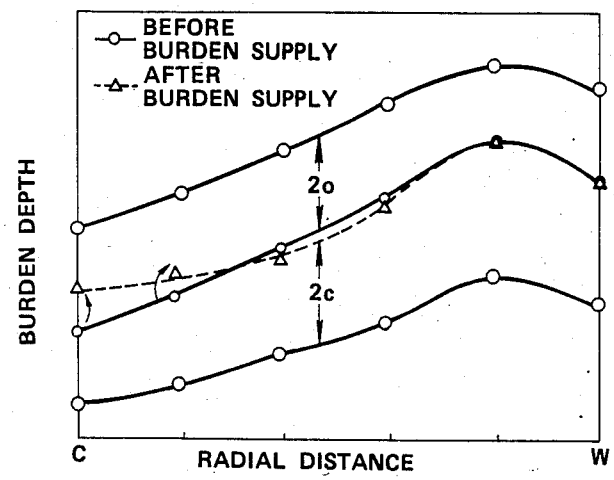
FIG. 11 shows typical burden profiles as in FIG. 4.
Figure 12:
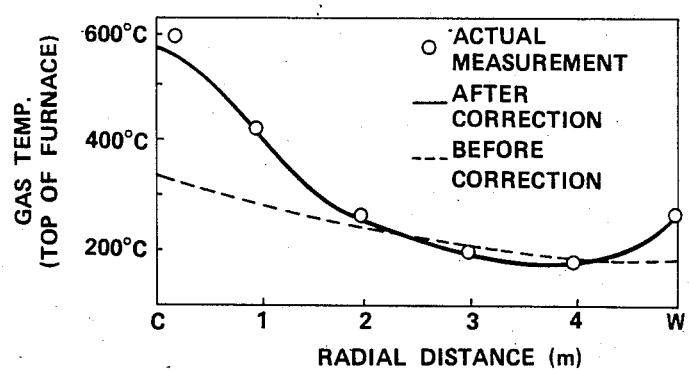
FIG. 12 shows actual measurements and values anticipated by theory of gas temperature versus radial position across the furnace.
Figure 13:
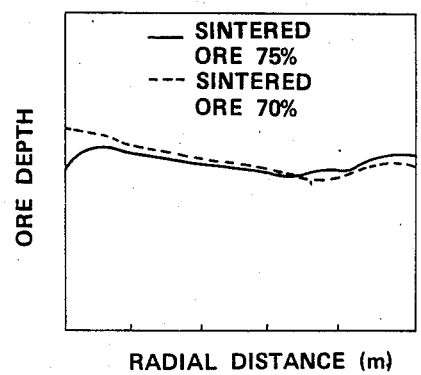
FIG. 13 shows ore layer depth profiles for two different grades of ore grain size preparation.

FIGS. 11, 12 and 13 show results of measurements of the burden depth carried out using the burden depth sensor of FIGS. 6 and 7. All measurements were taken in a shaft furnace approximately 10 m in diameter. FIG. 11 shows coke and ore layer depth $D_c$ and $D_o$ at a plurality of monitoring points aligned along a radius extending from the furnace center to the periphery of the furnace. FIG. 12 shows the radial distribution of gas temperature across the top of the furnace. FIG. 13 shows the profile of the top ore layer in the cases of 70% and 75% sintered ore.

These figures illustrate one of the practical problems to which the inventive system can be advantageously applied. First, FIG. 11 shows how unexpected deviations of burden profiles can occur upon addition of later burden layers. This fact came to light only because the inventive burden layer monitor could measure the height of the coke layer even under the overlying ore layer without further disturbing the burden.

FIG. 12 shows an actual gas temperature profile (circled data points) which deviates significantly from the anticipated profile (broken curve) derived from the assumption of the broken-line burden profiles shown in FIG. 11. Once the actual, deformed coke layer profile (solid curve in FIG. 11) is measured by the inventive system, the empirical gas temperature discrepancies can be shown analytically (solid curve in FIG. 12) to be due solely to the observed slumping of the coke layer toward the center of the furnace. The gas temperature profile can then be corrected by compensating for the burden deformation revealed by the inventive sensor. In this case, we adopted a more highly sintered grade of ore to offset the slumping tendency of the coke, as shown in FIG. 13.

FIGS. 14 to 17 shows the second embodiment of the burden distribution monitoring apparatus according to the present invention. The shown embodiment is applicable to measurement of burden distribution in a vertical reducing furnace. Alhough the disclosure for the second embodiment concentrates on grain size distribution measurement, it would of course be possible to measure the burden layer depth.

Figure 14:
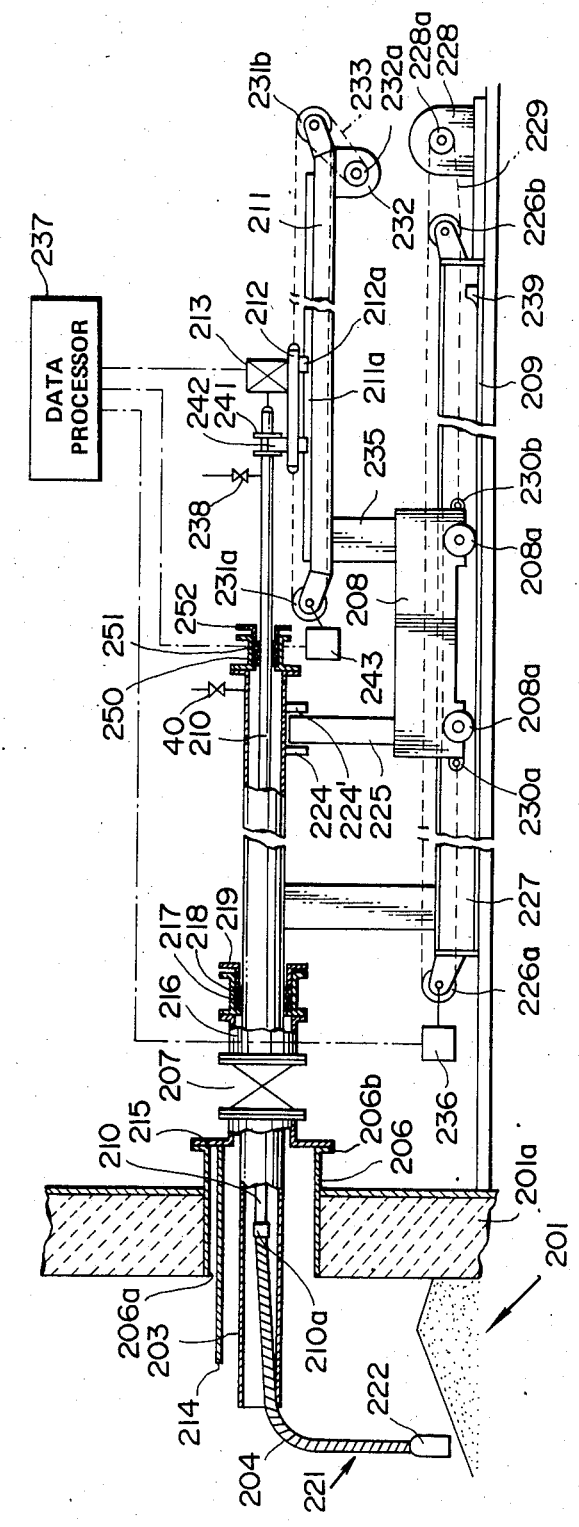
FIG. 14 is a diagram of a third preferred embodiment of the present invention.
Figure 15:
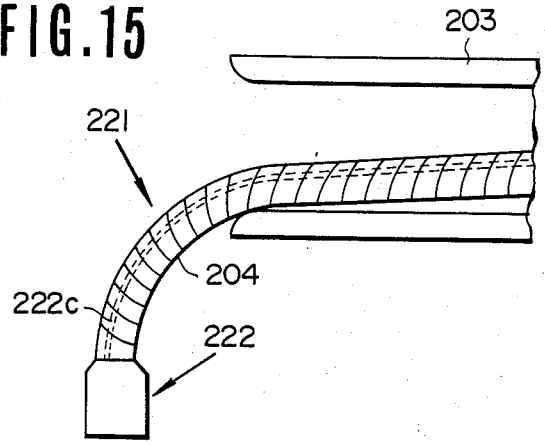
FIG. 15 is an enlarged view taken near the free end of the main sonde of FIG. 14.
Figure 16:
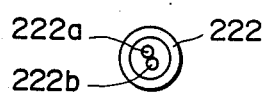
FIG. 16 is a cross-section through the sensor assembly of FIG. 15.
Figure 17:
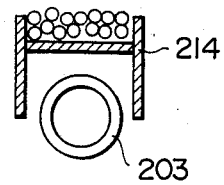
FIG. 17 is an end view taken of the main sonde and protecting member of FIG. 14.

As shown in FIGS. 14 to 16, the grain distribution sensor 221 generally comprises an optical sensor assembly 222 which includes a light emitter 222a and a fiber-scope 222b for receiving images of the surface of burden. The fiber-scope 222b is connected to a data processing unit 237 including an image analyzer through flexible optical fibers 222c extending through a protective flexible tube 204. The sensor assembly 222 is fixed to the free end of the tube 204 so that the light-emittor 222a and the fiber-scope 222b are exposed to the burden surface within the furnace. The flexible tube 204 extends through a main sonde 203 and is connected to an auxiliary sonde 210 through a coupler 210a. The auxiliary sonde 210 is coaxially arranged within the main sonde 203 and movable therealong. The main and auxiliary sonde 203 and 210 pass through a separation valve 207 which isolates the inside of the furnace 201 from the outside, and through a cylinder 206 secured to the inner periphery of an opening 206a through the furnace wall 201a. The cylinder 206 has a flange 206b at its outer end which is firmly connected to a flange 215 of the separating valve 207.

The main sonde 203 extends through the cylinder 206 into the furnace 1. A protecting member 214 extends through the cylinder and positioned above the main sonde 203. The protecting member 214 is formed into a substantially H-shaped cross section and has a width wide enough to cover the main sonde. This protecting member 214 is adapted to protect the main sonde from the burden supplied into the furnace under the presence of the sonde within the furnace. The main sonde 203 is supported by a carriage 208 by means of vertical supports 225. The upper end of the support 225 is connected to a pair of brackets 224 and 224' extending from the main sonde 203. The carriage 208 is mounted on wheels 208a engaging rails 209 firmly secured to a base 209a which also supports a chain drive 227. The chain drive 227 generally comprises a pair of sprockets 226a and 226b supported on a frame 226c, a chain wound around the sprockets 226a and 226b, a driving motor 228 with an output gear 228a and a driving chain 229 extending between the output gear 228a of the driving motor 228 and the sprocket 226b. Both ends of the chain 227 are connected to the carriage 208 by brackets 230a and 230b extending from opposite longitudinal ends of the carriage.

A rotation sensor 236 monitors the angular position of the sprocket 226a so as to monitor the carriage position. The rotation sensor 236 outputs the carriage position data to the data processor 237.

Another support 235 extending upwards from the carriage 208 supports a frame 211. One or more guide rails 211a mounted on the frame 211 movably support an auxiliary sonde carriage 212. The carriage 212 is provided with wheels or runners 212a facilitating movement along the guide rail 221a. The frame 211 also supports a pair of sprockets 231a and 231b at its opposite longitudinal ends. A chain 234 extending between the sprockets 231a and 231b is connected to either end of the carriage 212. A driving motor 232 with output gear 232a is also mounted on the frame 211. The output gear 232a is connected to the sprocket 231b by a driving chain 233. A rotation sensor 243 monitors the angular position of the sprocket 231a so as to monitor the position of the carriage 212. The rotation sensor 243 outputs the carriage position data to the data processor 237.

Seal boxes 217 and 250 are mounted at the ends of the cylinder 216 and of the main sonde 203, respectively. The seal box 217 serves as a gas-tight seal around the main sonde 203 and comprises a ground packing 218 and a packing retainer 219. Similarly, the seal box 250 serves as a gas-tight seal around the auxiliary sonde 210 and comprises a ground packing 251 and a packing retainer 252.

Given this construction, the main sonde 203 is movable horizontally to shift the sensor position radially across the furnace and the auxiliary sonde 210 moves with the main sonde 203 and, in addition, is movable independently of the main sonde for vertical height adjustment.

The auxiliary sonde 210 is connected to a $N_2$ gas source through a gas flow control valve 238. $N_2$ gas is supplied to the interior of the auxiliary sonde and circulates through the auxiliary sonde 210 and the flexible tube 204. This N₂ gas serves as coolant for the sensor assembly.

There are various ways to cool the sensor and/or the auxiliary sonde. Some modifications to the sensor cooling system are described with reference to FIGS. 18 to 20.

Figure 18:
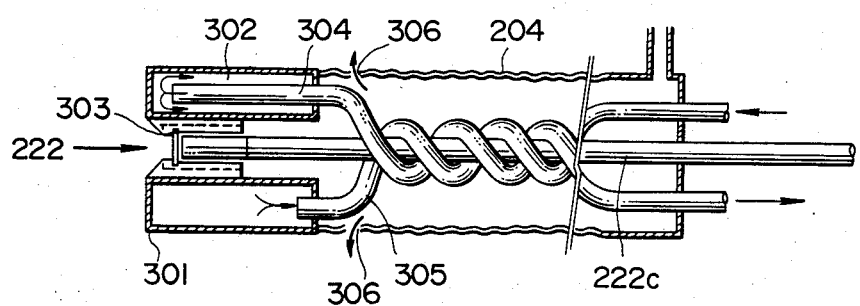
FIG. 18 is a diagram of a modification to the cooling system of the preferred embodiments of the invention.

In the modification shown in FIG. 18, a rigid pipe 301 is attached to the inner end of the flexible tube 204. The pipe 301 defines an annular cooling chamber 302 surrounding the sensor assembly 222 at a small annular clearance 303. The clearance 303 serves as the coolant gas path for circulating the coolant gas around the sensor assembly for purging.

The annular chamber 302 is connected to a liquid coolant source (not shown) through a coolant supply tube 304 and a coolant drain tube 305. The two tubes 304 and 305 are entwined around the optical fiber bundle 222c which transmits image data to the data processor 237. In order to achieve good cooling performance, the supply tube 304 extends through the annular chamber 302 up to the end opposing the sensor assembly. On the other hand, the drain tube 305 projects into the annular chamber 302 just past the end near the flexible tube 204.

The supply tube 304 and the drain tube 305 are wound helically about the optical fibers 222c as shown in FIG. 18. By adjusting the winding pitch of the tubes 304 and 305, the flexibility of the optical fibers 222c can be adjusted. For instance, when the tubes 304 and 305 are wound at a relatively tight pitch, the optical fibers 222c will be relatively stiff. Therefore, by gradually reducing the winding pitch toward the inner end, the optical fibers 222c can be made to be of uniform stiffness throughout the entire length.

The flexible tube 204 has a plurality of gas outlets 306 near the cooling pipe 301 for discharging the coolant gas to the atmosphere.

In practice, the coolant supply tube 304 and the coolant drain tube 305 are made of a water-resistant flexible tube with a diameter of approximately 10 mm.

Figure 20:
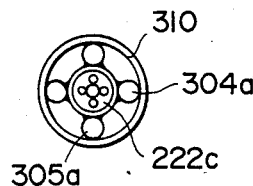
FIG. 20 is a cross-section taken from the cooling system of FIG. 19.
Figure 19:
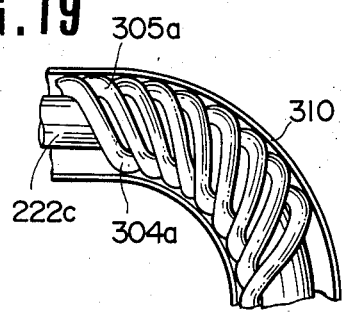
FIG. 19 is an enlarged diagram showing another modification to the cooling system.

FIGS. 19 and 20 show another modification of the foregoing second embodiment. In this embodiment, the optical fibers 222c and the sensor assembly 222 are surrounded by a metal tube 310. The supply tube 304a and the drain tube 305a are made of annealed lead soldered onto the tube 310.

Figure 21:
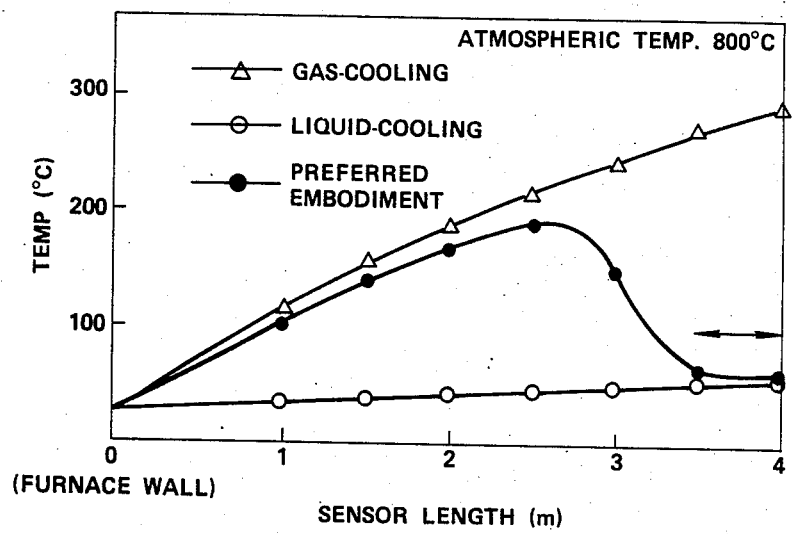
FIG. 21 plots temperature versus sensor assembly position for gas- and liquid-cooling systems as well as for the cooling system of the present invention.
Figure 22:
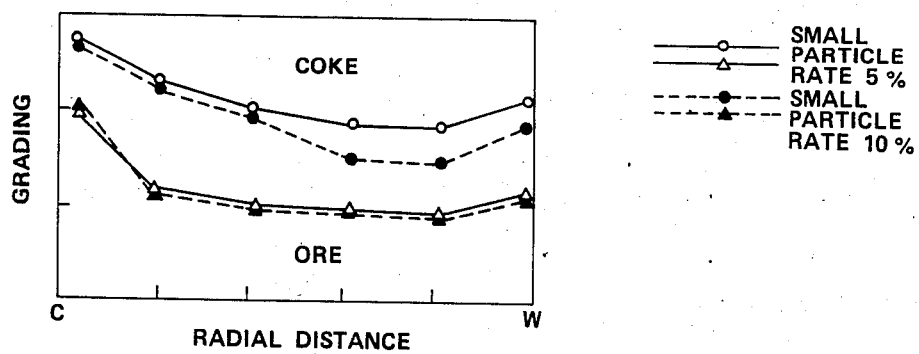
FIG. 22 plots observed particle size grade versus radial position for several different types of burden.

FIGS. 21 and 22 illustrate the cooling effect provided by the above sensor cooling system. For the benefit of these experiments, the sensor assembly 222 was replaced with a thermocouple. The cooling effect of the shown embodiment of FIGS. 18 to 20 was assessed by monitoring the temperature at the thermocouple mounted in the furnace in a 800° C. atmosphere at a distance of 4 m from the furnace wall, with cooling performed by means of gas-cooling A, liquid-cooling B and the gas-liquid cooling C employed by the preferred embodiment. The results of this experiment are shown in the following tables I and II.

TABLE I

| | Gas Flow Amount (l/min) | Gas Pressure (atm) | Initial Gas Temp. (°C.) | Liquid Amount (l/min) | Initial Liquid Temp. (°C.) |
| --- | --- | --- | --- | --- | --- |
| A | 500 | 5 | 25 | — | — |
| B | — | — | — | 5 | 20 |

TABLE I-continued

| | Gas Flow Amount (l/min) | Gas Pressure (atm) | Initial Gas Temp. (°C.) | Liquid Amount (l/min) | Initial Liquid Temp. (°C.) |
| --- | --- | --- | --- | --- | --- |
| C | 500 | 5 | 25 | 5 | 20 |

TABLE II

| | d(cm) |
| --- | --- |
| A | 50 |
| B | 90 |
| C | 60 |

As will be appreciated from FIG. 21, the temperature at the sensor assembly can be held to a safe, low level without unduly cooling the non-critical sections of the sensor assembly.

FIG. 22 shows the grain distribution in a furnace of about 4500 m³ capacity. Grain distribution of coke and ore are adjusted on the basis of the results of grain distribution monitoring. As set forth with respect to the second embodiment, by adjusting grain distribution so as to form burden layers of even thickness, the temperature distribution in the furnace can be improved.

As will be appreciated herefrom, the present invention fulfills all of the object and advantages sought therefor.

What is claimed is:

1. An apparatus for monitoring burden distribution in a furnace comprising:
   a hollow elongated cylindrical sonde having one end for insertion into an internal space of said furnace,
   means associated with said sonde for shifting the position of said one end radially inward and outward with respect to the center of said furnace;
   a burden distribution monitoring sensor for monitoring burden distribution in the upper region of said furnace and producing a signal indicative of monitored burden distribution, said sensor extending through said sonde and movable along the latter and having a working end for monitoring burden distribution, which working end extends from said one end of said sonde and is adapted to be radially displaced according to the displacement of said one end of said sonde relative to said center of said furnace; and
   data processing means associated with said sensor for receiving said burden distribution indicative signal for deriving burden distribution indicative data based thereof.

2. The apparatus as set forth in claim 1, wherein said sensor comprises a burden layer depth sensor for monitoring the depth of burden layer.

3. The apparatus as set forth in claim 1, wherein said sensor comprises a burden grain distribution sensor for monitoring grading of the burden.

4. The apparatus as set forth in claim 1, wherein said sensor comprises a burden depth sensor and a burden grain distribution sensor commonly guided by said sonde.

5. The apparatus as set forth in claim 4, wherein said burden depth sensor and a burden grain distribution sensor extend through said sonde in parallel relationship to each other.

6. The apparatus as set forth in claim 2, wherein said burden depth sensor comprises a flexible sensor body including a plurality of electrodes for monitoring electrical resistance therebetween for detecting borders of burden layers.

7. The apparatus as set forth in claim 6, wherein said burden depth sensor body is protected by a flexible protective cover extending with said sensor body.

8. The apparatus as set forth in claim 7, wherein said protective cover comprises a plurality of linked blocks, which cover is constructed to be bent in a predetermined direction to permit said sensor to be retracted into said sonde and to be prevented from bending in a direction other than said predetermined direction to resist radially inward movement of said sensor upon shifting of portions of said burden.

9. The apparatus as set forth in claim 6, wherein said sensor body comprises a plurality of blocks which are linked to adjacent blocks, and electrodes for measuring said electrical resistance formed on said blocks located at predetermined longitudinal positions and electrically insulated from said blocks.

10. The apparatus as set forth in claim 9, wherein said linked blocks are constructed to be bent in a predetermined direction and prevented from bending in directions other than said predetermined direction.

11. The apparatus as set forth in claim 3, wherein said burden grain distribution sensor comprises an optical sensor adapted to monitor the grading on the upper surface of the burden in said furnace.

12. The apparatus as set forth in claim 11, wherein said sensor further comprises means for cooling said sensor.

13. The apparatus as set forth in claim 12, wherein said sensor is covered with a flexible pipe which defines therein a cooling fluid path.

14. The apparatus as set forth in claim 13, wherein cooling fluid is $N_2$ gas which also serves as purging fluid for the working end of said sensor.

15. The apparatus as set forth in claim 14, wherein said cooling means further comprising a liquid coolant chamber defined adjacent said working end of said sensor for cooling said working end.

16. The apparatus as set forth in claim 15, wherein said liquid coolant chamber is in communication with a liquid coolant source by means of a flexible tube which is wound and said sensor approximately over length of said flexible pipe.

17. An apparatus for monitoring burden distribution in a furnace comprising:
 a hollow cylindrical sonde having a first end inserted into an internal space of said furnace;
 a sonde carrier to which a second end of said sonde is associated, said carrier being movable toward and away from said furnace for shifting said first end of sonde radially inward and outward within said internal space of said furnace relative to its center point; and
 a burden distribution monitoring sensor releasably and slidably inserted through said sonde and having a working end for monitoring burden distribution in said furnace, said working end being carried with said first end of said sonde radially within said furnace relative to said center point for performing burden distribution monitoring at radially arranged different points in said furnace.

18. The apparatus as set forth in claim 17, wherein said burden distribution monitoring sensor comprises a burden layer depth sensor and a burden grain distribution sensor, which are exchangeably inserted in said sonde.

19. The apparatus as set forth in claim 17, which further comprises a sensor carrier movable toward and away from said furnace independently of said sonde carrier for extending said sensor from said one end of said sonde toward the burden in the furnace.

20. The apparatus as set forth in claim 19, wherein said sensor carrier is cooperative with said sonde carrier for shifting said working end of said sensor in a radial direction according to radial shifting of said sonde as carried by said sonde carrier.

21. The apparatus as set forth in claim 17, wherein said burden distribution monitoring sensor is flexible and extends vertically at the portion extending from said one end of said sonde.

22. An apparatus for monitoring burden distribution in a furnace comprising:
 a hollow elongated sonde having a horizontally extending first section and a vertically extending second section, said first section having an inner portion inserted within an internal space of said furnace and an outer portion extending outwardly from said furnace, said second section being formed integrally with said first section and extending downward from said inner portion of said first section, said second section having a lower end opposing a burden within said furnace, said sonde defining a longitudinally extending path between said outer portion of said first section and said lower end of said second section;
 a burden distribution monitoring sensor extending through said longitudinally extending path of said sonde capable of slidable movement along said path, said burden distribution monitoring sensor being releasable from said sonde and exchangeable, said sensor having a working end to be substantially vertically introduced into said internal space of said furnace, and the other end extending from said outer end of said first section of said sonde, said sensor producing a signal indicative of monitored burden distribution; and
 a data processor associated with said sensor for receiving said burden distribution indicative signal for deriving burden distribution indicative data based thereon.

23. The apparatus as set forth in claim 22, wherein said burden distribution monitoring sensor comprises a burden layer depth sensor and a burden grain distribution sensor, which are exchangeably inserted in said sonde.

24. The apparatus as set forth in claim 22, which further comprises a sensor carrier movable toward and away from said furnace independently of said sonde carrier for extending said sensor from said one end of said sonde toward the burden in the furnace.

25. The apparatus as set forth in claim 22 wherein said sensor comprises a burden layer depth sensor for monitoring the depth of burden layer.

26. The apparatus as set forth in claim 22 wherein said sensor comprises a burden grain distribution sensor for monitoring grading of the burden.

27. The apparatus as set forth in claim 22 wherein said sensor comprises a burden depth sensor and a burden grain distribution sensor commonly guided by said sonde.

28. An apparatus for monitoring burden distribution in a furnace comprising:
 a hollow elongated cylindrical sonde having one end for insertion into an internal space of said furnace, means associated with said sonde for shifting the position of said one end radially inward and outward with respect to the center of said furnace;

a burden distribution monitoring sensor for monitoring burden distribution in the upper region of said furnace and producing a signal indicative of monitored burden distribution, said sensor comprising a burden layer depth sensor having a flexible sensor body including a plurality of electrodes for monitoring electrical resistance therebetween for detecting borders of burden layers, said sensor extending through said sonde and movable along the latter and having a working end for monitoring the depth of burden layer, which working end extends from said one end of said sonde and is adapted to be radially displaced according to the displacement of said one end of said sonde relative to said center of said furnace, said sensor body comprising a plurality of blocks which are linked to adjacent blocks, and electrodes for measuring said electrical resistance formed on said blocks located at predetermined longitudinal positions and electrically insulated from said blocks, said blocks being substantially rectangular in shape, each having a bore longitudinally extending from end to end, and each having a rounded extension which extends outwardly from one end of said block, each extension having a bore therethrough which is substantially perpendicular to said bores extending longitudinally through said blocks, said blocks also having a slot in the end opposite the end having an extension, said slots being of sufficient width to closely receive extensions form adjacent blocks, said ends having slots also having bores extending therethrough which are substantially parallel to said bores in said extensions such that pins may be inserted through said bores in said extensions and said bores in said ends having slots when said extensions are closely received by said slots, thereby swingably linking said blocks together; and data processing means associated with said sensor for receiving said burden distribution indicative signal for deriving burden distribution indicative data based thereon.

29. Apparatus as defined in claim 28, wherein portions of the ends of said blocks are angled inward, whereby said blocks are free to swing relative to each other to points where angled surfaces created by said angling meet, thereby restricting said swinging such that said blocks are angled with respect to each other to permit retraction of said sensor into said sonde.

30. An apparatus for monitoring burden distribution in a furnace comprising:

a hollow elongated cylindrical sonde having one end for insertion into an internal space of said furnace, means associated with said sonde for shifting the position of said one end radially inward and outward with respect to the center of said furnace;

a burden distribution monitoring sensor for monitoring burden distribution in the upper region of said furnace and producing a signal indicative of monitored burden distribution, said sensor comprising a burden layer depth sensor having a flexible sensor body including a plurality of electrodes for monitoring electrical resistance therebetween for detecting borders of burden layers, said sensor extending through said sonde and movable along the latter and having a working end for monitoring the depth of burden layers, which working end extends from said one end of said sonde and is adapted to be radially displaced according to the displacement of said one end of said sonde relative to said center of said furnace, said sensor body comprising a plurality of blocks which are linked to adjacent blocks, and electrodes for measuring said electrical resistance formed on said blocks located at predetermined longitudinal positions and electrically insulated from said blocks, said blocks being substantially rectangular in shape, each having a bore longitudinally extending from end to end, and each having a rounded extension which extends outwardly from one end of said block, each extension having a bore therethrough which is substantially perpendicular to said bores extending longitudinally through said blocks, said blocks also having a slot in the end opposite the end having an extension, said slots being of sufficient width to closely receive extensions from adjacent blocks, said ends having slots also having bores extending therethrough which are substantially parallel to said bores in said extensions such that pins may be inserted through said bores in said extensions and said bores in said ends having slots when said extensions are closely received by said slots, thereby swingably linking said blocks together for bending in a predetermined direction and not bending in directions other than said predetermined direction; and data processing means associated with said sensor for receiving said burden distribution indicative signal for deriving burden distribution indicative data based thereon.

* * * * *